(12) United States Patent
Choi et al.

(10) Patent No.: US 6,429,918 B1
(45) Date of Patent: Aug. 6, 2002

(54) LIQUID CRYSTAL DISPLAY HAVING HIGH APERTURE RATIO AND HIGH TRANSMITTANCE

(75) Inventors: Woo Ho Choi, Seoul; Seong Jun An; Jong Yob Jeon, both of Kyoungki-do, all of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 09/428,273

(22) Filed: Oct. 27, 1999

(30) Foreign Application Priority Data

Oct. 29, 1998 (KR) .......................................... 98-45785

(51) Int. Cl.[7] ............................................ G02F 1/1335
(52) U.S. Cl. ...................................... 349/111; 349/141
(58) Field of Search .................................. 349/111, 141

(56) References Cited

U.S. PATENT DOCUMENTS

| 5,831,701 A | * | 11/1998 | Matsuyama et al. ......... 349/110 |
| 5,859,677 A |   | 1/1999  | Watanabe et al. |
| 5,907,380 A |   | 5/1999  | Lien |
| 6,222,599 B1 | * | 4/2001 | Yoshida et al. .............. 349/106 |
| 6,271,903 B1 | * | 8/2001 | Shin et al. .................. 349/110 |

FOREIGN PATENT DOCUMENTS

| JP | 10105084 | 4/1998 |
| JP | 10269020 | 10/1998 |

* cited by examiner

Primary Examiner—James Dudek
(74) Attorney, Agent, or Firm—Selitto, Behr & Kim

(57) ABSTRACT

Disclosed is a liquid crystal display having high aperture ratio and high transmittance that is capable of reducing the size of a leakage light generating region.

The present invention provides a liquid crystal display comprising: a lower substrate; a gate bus line and a data bus line, both disposed in an active matrix type so as to define a sub-pixel on the lower substrate; a counter electrode formed at the sub-pixel region of the lower substrate, made of a transparent material, wherein a common signal is applied to the counter electrode; a pixel electrode formed at the sub-pixel region of the lower substrate, made of a transparent material, wherein the pixel electrode forms a fringe field with the counter electrode; a thin film transistor formed at an intersection of the gate bus line and the data bus line, wherein when the gate bus line is selected, the thin film transistor transmits a signal of the data bus line to the pixel electrode; an upper substrate opposed to the lower substrate with intervening a selected distance; a black matrix formed at an inner surface of the upper substrate and arranged so as to define the sub-pixel; a shielding electrode formed at an inner surface of the upper substrate and disposed at a location corresponding to the data bus line of the lower substrate; and a liquid crystal layer sandwiched between the upper and the lower substrates, wherein when the gate bus line is not selected, the shielding electrode forms an electric field with the data bus line.

11 Claims, 4 Drawing Sheets

LIQUID CRYSTAL DISPLAY HAVING HIGH APERTURE RATIO AND HIGH TRANSMITTANCE

BACKGROUND OF THE INVENTION

Field of the Invention

The present invention relates to a liquid crystal display having high aperture ratio and high transmittance, and more particularly to a liquid crystal display having high aperture ratio and high transmittance, that is capable of reducing light leakage.

DESCRIPTION OF THE RELATED ART

An In-plane Switching(IPS) mode liquid crystal display has been suggested to overcome the narrow viewing angle characteristic of a twisted nematic(TN) mode liquid crystal display.

In the IPS mode liquid crystal display, counter and pixel electrodes for driving liquid crystal molecules are arranged at the same substrate so as to generate an in-plane electric field. However, both counter and pixel electrodes of the IPS mode liquid crystal display are made of an opaque metal layer and arranged at pixel area, therefore the transmittance and the aperture ratio are very low.

Accordingly, a liquid crystal display using a fringe field for driving the liquid crystal molecules has been suggested to improve the transmittance and the aperture ratio of the IPS mode liquid crystal display.

The liquid crystal display using the fringe field so as to drive liquid crystal molecules has following constitutions.

The liquid crystal display having high transmittance and high aperture ratio is active matrix type that a signal from a data bus line is transmitted to a pixel electrode when a gate bus line is selected. When the display signal is applied to the pixel electrode, there is formed an electric field between the pixel electrode and the counter electrode to which a common signal is applied, thereby driving the liquid crystal molecules.

Herein, both counter and pixel electrodes for driving liquid crystal molecules are made of a transparent conductor and a distance between adjoining counter electrode and pixel electrode is narrower than the distance between upper and lower substrates.

As constituted above, all the liquid crystal molecules on and between the counter electrode and the pixel electrode are driven by the electric field formed between the counter electrode and the pixel electrode. Therefore, transmittance of the liquid crystal display is more improved.

However, a relatively high display signal is continuously applied to the data bus line though the gate bus line is not selected. Consequently, there is formed a parasitic electric field between the data bus line to which the display signal is applied and its adjoining counter electrode or the pixel electrode. Due to the parasitic electric field, liquid crystal molecules between the data bus line and its adjoining counter electrode are driven thereby leaking light when a sub-pixel not is selected. At this time, the liquid crystal display having high transmittance and high aperture ratio has a distance between the counter electrode and the data bus line that is narrower than that of the general IPS mode liquid crystal display. For this reason, the parasitic electric field of the liquid crystal display having high transmittance and high aperture ratio is generated more excessively than the IPS mode liquid crystal display.

FIG. 1 is a simulation result showing leakage light of a conventional liquid crystal display having high transmittance and high aperture ratio. Referring to FIG. 1, when a voltage of 6.5V is applied to the data bus line, approximately 50% of leakage light is occurred around the data bus line. More particularly, the leakage light is occurred to 9 μm of both sides of the data bus line. Herein, X portion in the drawing stands for the distribution of liquid crystal molecules and equipotential line e, and Y portion stands for the light transmittivity. When the leakage light is occurred as described above, contrast ratio of the liquid crystal display is lowered thereby degrading the display quality.

In order to prevent the leakage light that is generated through such a wide region, a method for forming a black matrix to have relatively wide size that is enough to cover a region in which the leakage light is formed. However, the black matrix decreases aperture size of the sub-pixel, therefore wanted aperture ratio can not be obtained.

SUMMARY OF THE INVENTION

Accordingly, it is the object of the present invention to provide a liquid crystal display having high transmittance and high aperture ratio, that is capable of preventing leakage light and lowering of aperture ratio.

To accomplish the object, the liquid crystal display according to the present invention comprises: a lower substrate; a gate bus line and a data bus line, both disposed in an active matrix type so as to define a sub-pixel on the lower substrate; a counter electrode formed at the sub-pixel region of the lower substrate, made of a transparent material, wherein a common signal is applied to the counter electrode; a pixel electrode formed at the sub-pixel region of the lower substrate, made of a transparent material, wherein the pixel electrode forms a fringe field with the counter electrode; a thin film transistor formed at an intersection of the gate bus line and the data bus line, wherein when the gate bus line is selected, the thin film transistor transmits a signal of the data bus line to the pixel electrode; an upper substrate opposed to the lower substrate with intervening a selected distance; a black matrix formed at an inner surface of the upper substrate and arranged so as to define the sub-pixel; a shielding electrode formed at an inner surface of the upper substrate and disposed at a location corresponding to the data bus line of the lower substrate; and a liquid crystal layer sandwiched between the upper and the lower substrates, wherein when the gate bus line is not selected, the shielding electrode forms an electric field with the data bus line.

The liquid crystal display further comprises: a lower substrate; a gate bus line and a data bus line, both disposed in an active matrix type so as to define a sub-pixel on the lower substrate; a counter electrode formed at the sub-pixel region of the lower substrate, made of a transparent material, wherein a common signal is applied to the counter electrode; a pixel electrode formed at the sub-pixel region of the lower substrate, made of a transparent material, wherein the pixel electrode forms a fringe field with the counter electrode; a thin film transistor formed at an intersection of the gate bus line and the data bus line, wherein when the gate bus line is selected, the thin film transistor transmits a signal of the data bus line to the pixel electrode; an upper substrate opposed to the lower substrate with intervening a selected distance; a black matrix formed at an inner surface of the upper substrate and arranged so as to define the sub-pixel; a shielding electrode formed at an inner surface of the upper substrate and disposed at a location corresponding to the data bus line of the lower substrate; and a liquid crystal layer sandwiched between the upper and the lower substrates, wherein the same signal as applied to the counter electrode is applied to the shielding electrode, and when the gate bus line is not selected, the shielding electrode forms an electric field with the data bus line.

The liquid crystal display still comprises: a lower substrate; a gate bus line and a data bus line, both disposed in an active matrix type so as to define a sub-pixel on the lower substrate; a counter electrode formed at the sub-pixel region of the lower substrate, made of a transparent material, wherein a common signal is applied to the counter electrode; a pixel electrode formed at the sub-pixel region of the lower substrate, made of a transparent material, wherein the pixel electrode forms a fringe field with the counter electrode; a thin film transistor formed at an intersection of the gate bus line and the data bus line, wherein when the gate bus line is selected, the thin film transistor transmits a signal of the data bus line to the pixel electrode; a first alignment layer formed on the resultant of the lower substrate; an upper substrate opposed to the lower substrate with intervening a selected distance; a black matrix formed at an inner surface of the upper substrate and arranged so as to define the sub-pixel; a second alignment layer formed on the upper substrate in which the black matrix. is formed; a shielding electrode formed at an inner surface of the upper substrate and disposed at a location corresponding to the data bus line of the lower substrate; and a liquid crystal layer sandwiched between the upper and the lower substrates, wherein the same signal as applied to the counter electrode is applied to the shielding electrode, and the width of the shielding electrode is wider than that of the data bus line and the width of the shielding electrode is equal or narrower than that of the black matrix, and when the gate bus line is not selected, the shielding electrode forms an electric field with the data bus line.

DETAILED DESCRIPTION OF THE PREFERRED EMBODIMENTS

Hereinafter, preferred embodiments of the present invention will now be made with reference to attached drawings.

Figure 1:
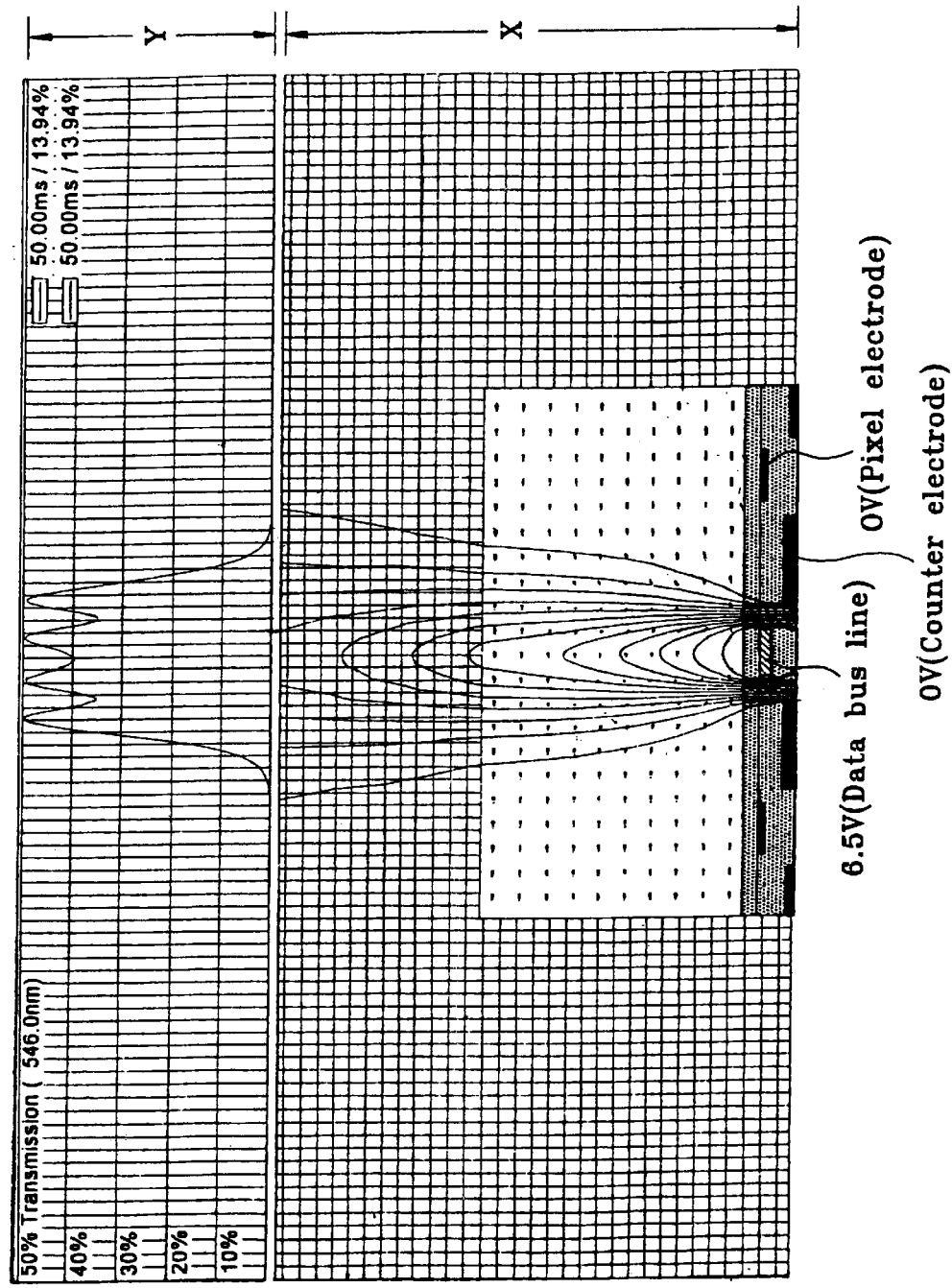
FIG. 1 is a simulation graph showing the arrangement of liquid crystal molecules of a conventional liquid crystal display having high transmittance and high aperture ratio.
Figure 2:
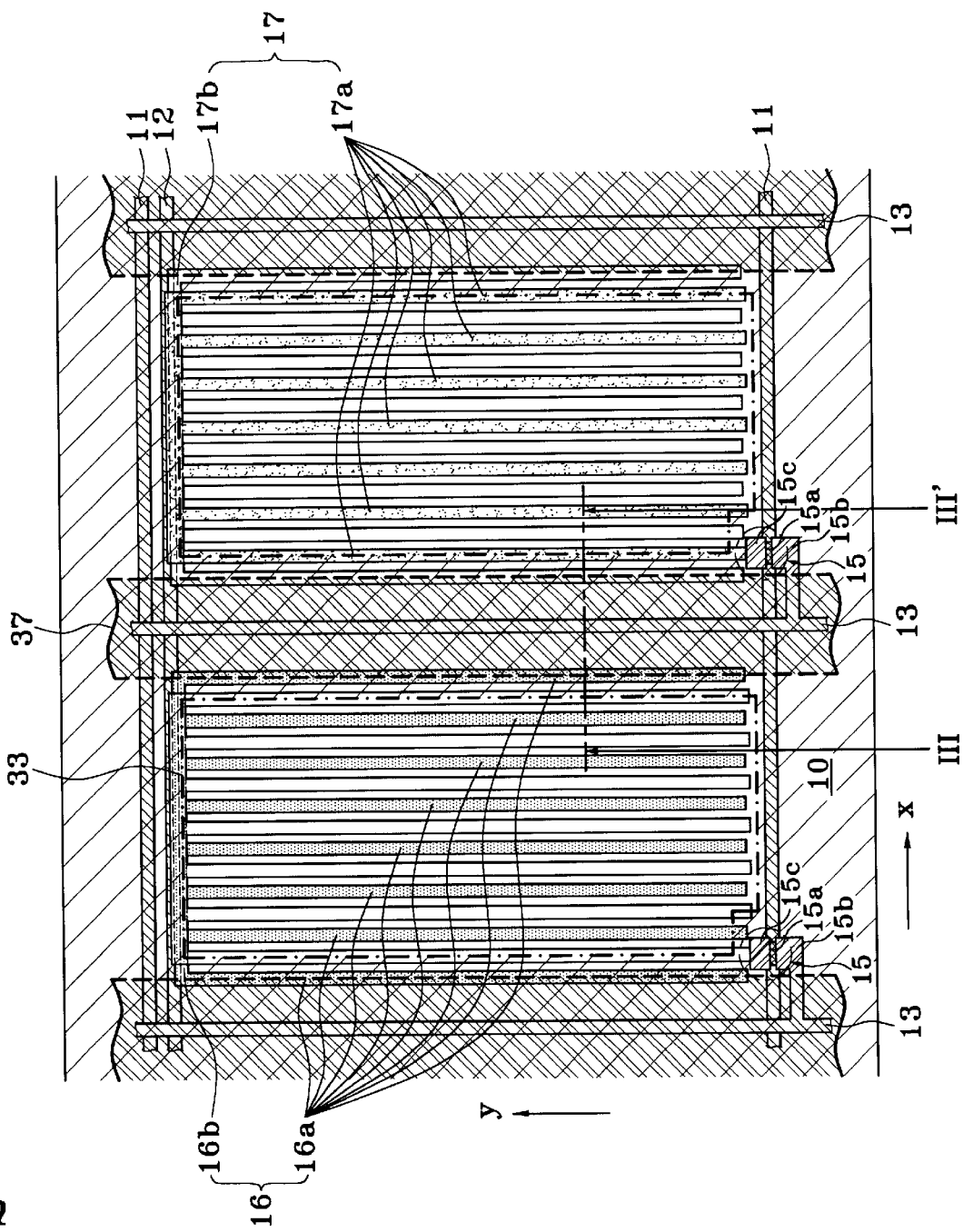
FIG. 2 a plan view showing a liquid crystal display having high aperture ratio according to the present invention.
Figure 3:
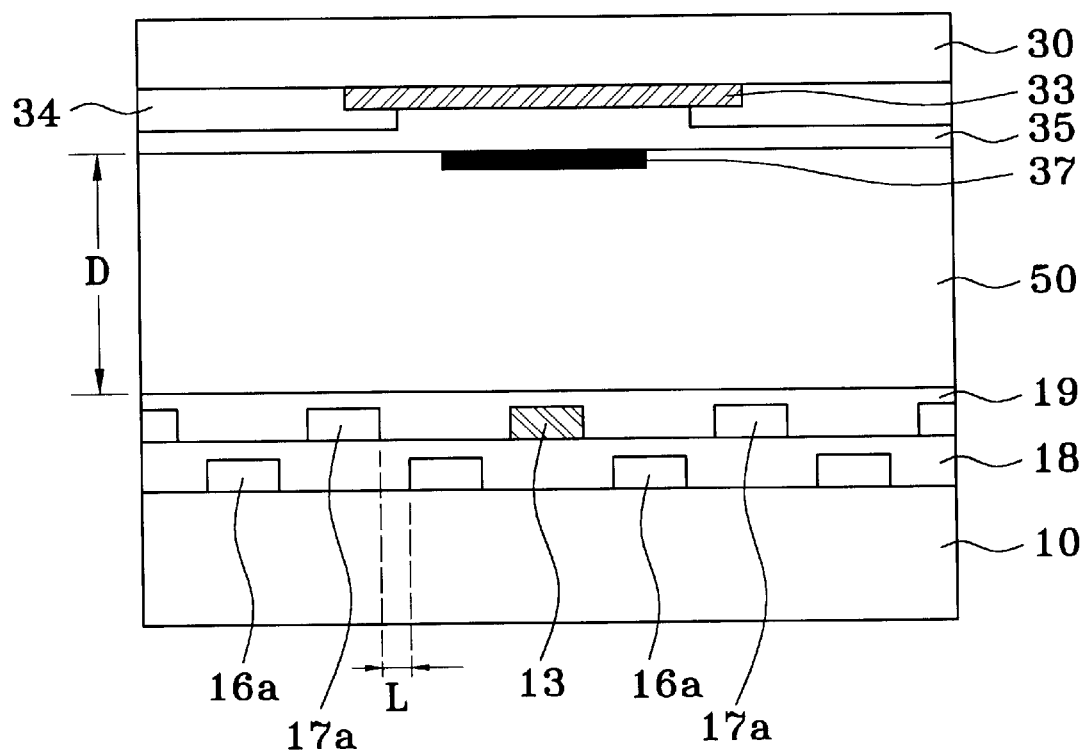
FIG. 3 is a cross-sectional view taken along a line III–III' of FIG. 2.

FIG. 2 is a plan view showing a liquid crystal display having high aperture ratio according to the present invention, and FIG. 3 is a cross-sectional view taken along a line III–III' of FIG. 2.

Referring to FIGS. 2 and 3, a plurality of gate bus lines 11 are extended on a lower substrate 10 with a selected distance in the x direction shown in drawings and a plurality of data bus lines 13 are extended on the lower substrate 10 with a selected distance in the y direction, thereby defining sub-pixels. The gate bus line 11 and the data bus line 13 are electrically insulated from each other. A common signal line 12 is extended parallel to the gate bus line 11 and disposed between a pair of gate bus lines 11 which are disposed adjacent to each other. For example, the common signal line 12 can be arranged adjacent to a previous gate bus line. Herein, the gate bus line 11, the common signal line 12, the data bus line 13 are made of an opaque metal layer so as to decrease the RC delay. A thin film transistor 15 is formed around an intersection of the gate bus line 11 and the data bus line 13. The thin film transistor 15 includes the gate bus line 11 acting as a gate electrode; a channel layer 15a formed at a selected portion on the gate bus line 11; a source electrode 15b overlapped with one side of the channel layer and extended from the data bus line 13; and a drain electrode 15c overlapped with the other side of the channel layer 15a.

A counter electrode 16 is formed at each sub-pixel of the lower substrate 10. Herein, the counter electrode 16 is in contact with the common signal line 12 thereby receiving a common signal. Further, the counter electrode 16 is made of a transparent conductor, for example indium tin oxide(ITO) material and disposed in the shape of a comb. That is, the counter electrode 16 includes a plurality of branches 16a that are extended parallel to the data bus line 13 and a body portion 16b that is connected to one ends of the branches 16a and is extended parallel to the gate bus line 11. The body portion 16b is in contact with the common signal line 12 and separated from the branches 16b with equal distance. Further, both outermost branches 16b among the branches are separated from the data bus line 13 by a selected distance.

A pixel electrode 17 is formed at each sub-pixel in which the counter electrode 16 is formed. Herein, the pixel electrode 17 and the counter electrode 16 are insulated from each other. Similar to the counter electrode 16, the pixel electrode 17 is made of a transparent conductor, for example indium tin oxide(ITO) material and disposed in the shape of a comb. That is, the pixel electrode 17 includes a plurality of strips 17a disposed between the branches 16a of the counter electrode 16 and disposed parallel to the data bus line 13, and a bar 17b connecting ends of the strips 17a and overlapping with the body portion 16b of the counter electrode 16. At this time, one among the strips 16a is contacted with a drain of the thin film transistor 15.

A gate insulating layer 18 insulates not only the gate bus line 11 and the data bus line 15, but also the counter electrode 16 and the pixel electrode 17. A first alignment layer 19 is formed at an inner surface of the lower substrate An upper substrate 30 is disposed with intervening a selected distance(hereinafter, a cell gap "D") from the lower substrate 10. Herein, a distance L between the branches 16a of the counter electrode 16 is narrower than the cell gap D, and widths of the branches 16a of the counter electrode 16 and the strips 17a of the pixel electrode 17 are selected such that no equipotential area are not formed during forming an electric field between the branches 16a of the counter electrode 16 and the strips 17a of the pixel electrode 17.

A black matrix 33 is formed at an inner surface of the upper substrate 30 so as to correspond with the data bus line 13. The black matrix 33 is made of a black resin material having volume resistance of $10^6$ Ω cm, and the black matrix 33 has a wider width than the data bus line 13 so as to prevent leakage light generated around the data bus line 13, but the black matrix 33 has a narrower width than the conventional width. Color filters 34 are formed at both sides of a sub-pixel defined by the black matrix 33. A second alignment layer 35 is formed on the black matrix 33 and the color filter 34. A shielding electrode 37 is made of an opaque metal layer or a transparent metal layer, and its width is wider than that of the data bus line 13 and equal or narrower than that of the black matrix 33. Further, a common signal, the same signal applied to the counter electrode 16 is applied to the shielding electrode 37. A liquid crystal layer 50 is sandwiched between the lower substrate 10 and the upper substrate 30, and the liquid crystal layer 50 also includes a plurality of liquid crystal molecules (not shown). Herein, the liquid crystal layer 50 is positive dielectric anisotropic or selectively negative dielectric anisotropic. Preferably, a product of the index of refractive anisotropy and the cell gap of the liquid crystal molecules, i.e. $\Delta n \times D$, is 0.2~0.6 µm.

When the gate bus line 11 is selected, the display signal applied to the data bus line 13 is transmitted to the pixel electrode 17. Then, there is formed an electric field between the counter electrode 16 to which the common signal is continuously applied, and the pixel electrode 17. As described in detail, the distance between the branches 16a of the counter electrode 16 and the strips 17a of the pixel electrode 17 is sufficiently narrower than that of the cell gap thereby forming a fringe field between the branches 16a of the counter electrode 16 and the strips 17a of the pixel electrode 17. Due to this fringe field, all liquid crystal molecules on and between the branches 16a of the counter electrode 16 and the strips 17a of the pixel electrode 17 are driven.

In the meantime, when the gate bus line 11 is not selected, the data bus line 13 forms an electric field with the shielding electrode 37 rather to form the electric field with its adjoining branches 16a of the counter electrode 16 or the strips 17a of the pixel electrode 17. As a result, the generation of parasitic electric field between the data bus line 13 and the branches 16a of the counter electrode 16 or between the data bus line 13 and the strips 17a of the pixel electrode 17, is decreased. Therefore, the leakage light is also reduced. At this time, although there is formed the parasitic electric field, the parasitic electric field generating region is shield by the black matrix 33, and there is no influence at the leakage current. Accordingly, since the leakage light generating region is reduced, the width of the black matrix 33 is also reduced thereby improving the aperture ratio.

Figure 4:
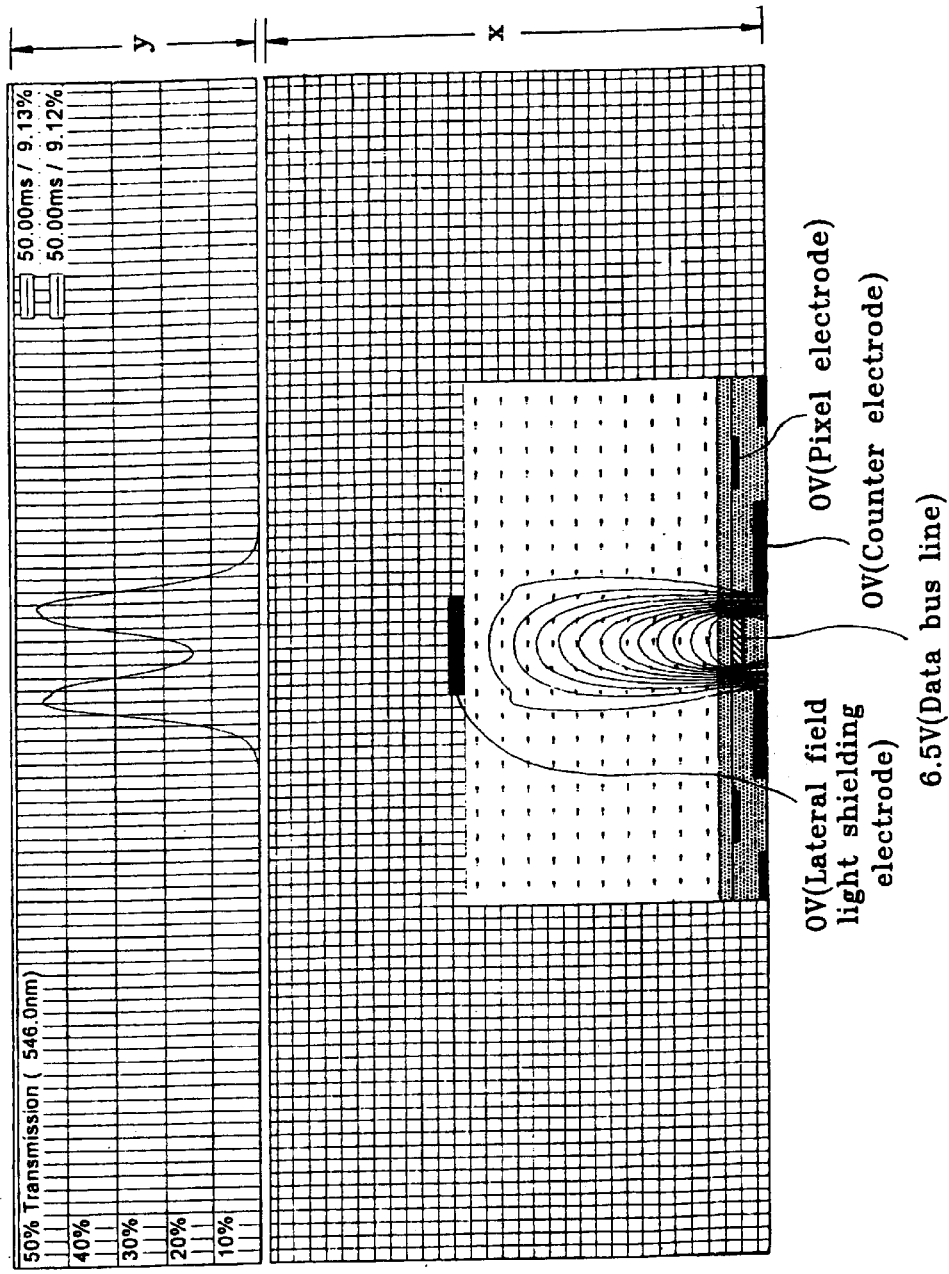
FIG. 4 is a simulation graph showing the arrangement of liquid crystal molecules of the liquid crystal display having high transmittance and high aperture ratio according to the present invention.

FIG. 4 is a graph showing a simulation result of the liquid crystal molecules of the liquid crystal display having high aperture ratio and high transmittance according to the present invention, wherein a display signal of 6.5 V is applied to the data bus line 13 and 0 V is applied to the counter electrode 16. Referring to FIG. 4, a parasitic electric field generated between the data bus line 13 and outer branches 16a of the counter electrode 16 is also reduced by forming the shielding electrode 37. Therefore, it is seen from the drawings that the leakage light generating region is more reduced compared to the conventional one. Under such conditions(refer to FIG. 2), 9 µm of light leakage is occurred in the conventional liquid crystal display having high aperture ratio and high transmittance. Meanwhile, the leakage light of the liquid crystal display having high aperture ratio and high transmittance of the present invention is occurred within 7 µm at both sides of the data bus line 13, and the width of the black matrix 33 is reduced. Accordingly, it is improved approximately 4% of aperture ratio of the present invention liquid crystal display having high aperture ratio and high transmittance. Herein, X region in the drawing stands for distribution of the liquid crystal molecules and the equipotential line e, and the Y region stands for the transmittance of light.

As described in the above specification, according to the liquid crystal display having high aperture ratio and high transmittance of the present invention, there is formed a shielding electrode for shielding leakage light at the upper substrate that is corresponding to the data bus line. Consequently, when the gate bus line is not selected, the data bus line forms an electric field with the shielding electrode rather to form the electric field with its adjoining branches of the counter electrode or the strips of the pixel electrode. As a result, the generation of parasitic electric field between the data bus line and the branches of the counter electrode or between the data bus line and the strips of the pixel electrode, is reduced. The leakage light generating region is also reduced. Therefore, size of the black matrix is reduced thereby improving the aperture ratio.

While the present invention has been described with reference to certain preferred embodiment, various other modifications will be apparent to and can be readily made by those skilled in the art without departing from the scope and spirit of the present invention.

What is claimed is:

1. A liquid crystal display having high aperture ratio and high transmittance comprising:

a lower substrate;

a gate bus line and a data bus line, both disposed in an active matrix type so as to define a sub-pixel on the lower substrate;

a counter electrode formed at the sub-pixel region of the lower substrate, made of a transparent material, wherein a common signal is applied to the counter electrode;

a pixel electrode formed at the sub-pixel region of the lower substrate, made of a transparent material, wherein the pixel electrode forms a fringe field with the counter electrode;

a thin film transistor formed at an intersection of the gate bus line and the data bus line, wherein when the gate bus line is selected, the thin film transistor transmits a signal of the data bus line to the pixel electrode;

an upper substrate opposed to the lower substrate with intervening a selected distance;

a black matrix formed at an inner surface of the upper substrate and arranged so as to define the sub-pixel;

a shielding electrode formed at an inner surface of the upper substrate and disposed at a location corresponding to the data bus line of the lower substrate; and a liquid crystal layer sandwiched between the upper and the lower substrates, wherein when the gate bus line is not selected, the shielding electrode forms an electric field with the data bus line.

2. The liquid crystal display of claim 1, wherein the same signal as applied to the counter electrode is applied to the shielding electrode.

3. The liquid crystal display of claim 1, wherein the width of the shielding electrode is wider than that of the data bus line, and equal or narrower than that of the black matrix.

4. The liquid crystal display of claim 1, wherein the shielding electrode is made of an opaque metal layer.

5. The liquid crystal display of claim 1, further comprising a first alignment layer at the inner surface of the upper substrate, and a second alignment layer between the black matrix and the shielding electrode.

6. A liquid crystal display having high aperture ratio and high transmittance comprising:

a lower substrate;

a gate bus line and a data bus line, both disposed in an active matrix type so as to define a sub-pixel on the lower substrate;

a counter electrode formed at the sub-pixel region of the lower substrate, made of a transparent material, wherein a common signal is applied to the counter electrode;

a pixel electrode formed at the sub-pixel region of the lower substrate, made of a transparent material, wherein the pixel electrode forms a fringe field with the counter electrode;

a thin film transistor formed at an intersection of the gate bus line and the data bus line, wherein when the gate bus line is selected, the thin film transistor transmits a signal of the data bus line to the pixel electrode;

an upper substrate opposed to the lower substrate with intervening a selected distance;

a black matrix formed at an inner surface of the upper substrate and arranged so as to define the sub-pixel;

a shielding electrode formed at an inner surface of the upper substrate and disposed at a location corresponding to the data bus line of the lower substrate; and a liquid crystal layer sandwiched between the upper and the lower substrates,
wherein the same signal as applied to the counter electrode is applied to the shielding electrode, and when the gate bus line is not selected, the shielding electrode forms an electric field with the data bus line.

7. The liquid crystal display of claim 6, wherein the width of the shielding electrode is wider than that of the data bus line, and equal or narrower than that of the black matrix.

8. The liquid crystal display of claim 6, wherein the shielding electrode is made of an opaque metal layer.

9. The liquid crystal display of claim 6, further comprising a first alignment layer at the inner surface of the upper substrate, and a second alignment layer between the black matrix and the shielding electrode.

10. A liquid crystal display having high aperture ratio and high transmittance comprising:

a lower substrate;

a gate bus line and a data bus line, both disposed in an active matrix type so as to define a sub-pixel on the lower substrate;

a counter electrode formed at the sub-pixel region of the lower substrate, made of a transparent material, wherein a common signal is applied to the counter electrode;

a pixel electrode formed at the sub-pixel region of the lower substrate, made of a transparent material, wherein the pixel electrode forms a fringe field with the counter electrode;

a thin film transistor formed at an intersection of the gate bus line and the data bus line, wherein when the gate bus line is selected, the thin film transistor transmits a signal of the data bus line to the pixel electrode;

a first alignment layer formed on the resultant of the lower substrate;

an upper substrate opposed to the lower substrate with intervening a selected distance;

a black matrix formed at an inner surface of the upper substrate and arranged so as to define the sub-pixel;

a second alignment layer formed on the upper substrate in which the black matrix is formed;

a shielding electrode formed at an inner surface of the upper substrate and disposed at a location corresponding to the data bus line of the lower substrate; and a liquid crystal layer sandwiched between the upper and the lower substrates,
wherein the same signal as applied to the counter electrode is applied to the shielding electrode, and the width of the shielding electrode is wider than that of the data bus line and the width of the shielding electrode is equal or narrower than that of the black matrix, and when the gate bus line is not selected, the shielding electrode forms an electric field with the data bus line.

11. The liquid crystal display of claim 10, wherein the shielding electrode is made of an opaque metal layer.

* * * * *